US008261998B2

(12) United States Patent
Roncari et al.

(10) Patent No.: US 8,261,998 B2
(45) Date of Patent: Sep. 11, 2012

(54) CUSTOMIZABLE TRANSACTION CARD

(75) Inventors: Christopher Michael Roncari, New York, NY (US); Di Wu, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 12/916,823

(22) Filed: Nov. 1, 2010

(65) Prior Publication Data
US 2011/0101111 A1    May 5, 2011

Related U.S. Application Data

(60) Provisional application No. 61/257,617, filed on Nov. 3, 2009.

(51) Int. Cl.
*G06K 19/05*    (2006.01)

(52) U.S. Cl. .................................. 235/492; 235/487
(58) Field of Classification Search .................. 235/487, 235/492, 493
See application file for complete search history.

(56) References Cited

U.S. PATENT DOCUMENTS

| 6,019,284 | A  | * | 2/2000 | Freeman et al. | 235/380 |
| 7,284,708 | B2 | * | 10/2007 | Martin | 235/492 |
| 2005/0275870 | A1 | * | 12/2005 | Elarde et al. | 358/1.15 |
| 2007/0108294 | A1 | * | 5/2007 | Rossiter | 235/492 |

* cited by examiner

*Primary Examiner* — Daniel St.Cyr
(74) *Attorney, Agent, or Firm* — Snell & Wilmer L.L.P.

(57) ABSTRACT

A financial transaction device is disclosed. The device includes a first surface and a second surface. The first surface comprises a writable field enabling a writing instrument and/or a printing device to write on the first writable field. The writable field allows transaction device purchasers to include a custom note, picture, design, logo, pattern and/or any other indicia on the device. The writable field creates an added element of thoughtfulness to make the gift exchange more special.

20 Claims, 1 Drawing Sheet

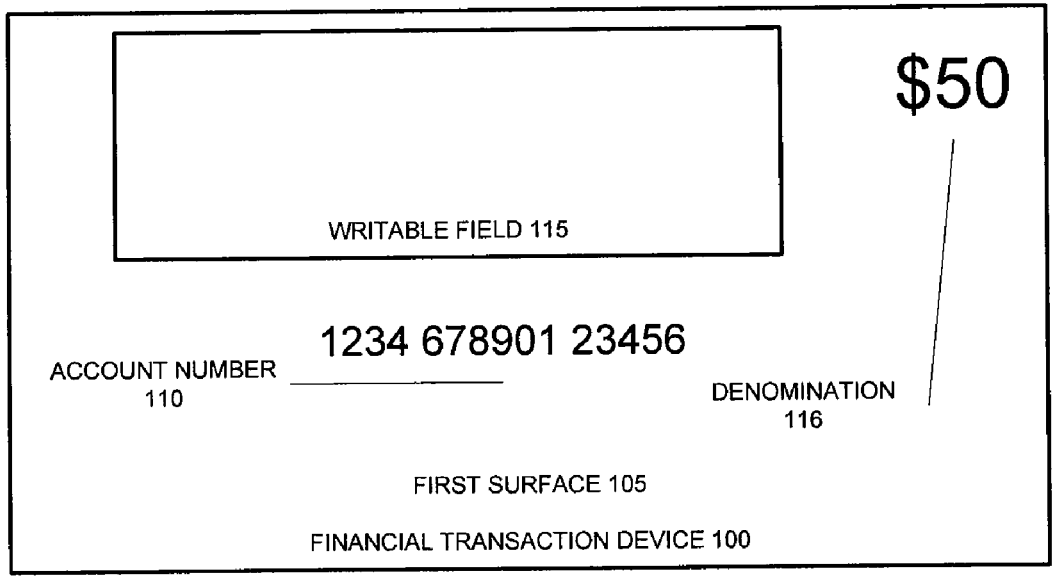
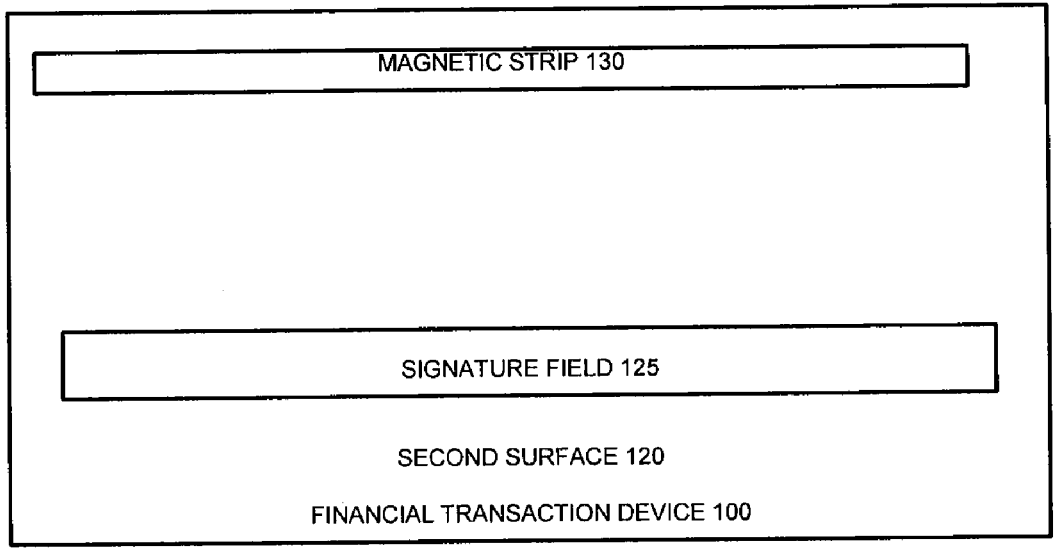

CUSTOMIZABLE TRANSACTION CARD

RELATED APPLICATIONS

This application claims priority to, and the benefit of, U.S. Provisional Application No. 61/257,617 filed on Nov. 3, 2009 entitled "Customizable Transaction Card," the entire content of which is hereby incorporated by reference.

BACKGROUND OF THE INVENTION

Gift cards and other transactions cards have evolved over time. Some of the changes included the addition of logos, special colors, and designs, while other changes were more functional such as reload functions and use at multiple merchant types within a certain affiliated group (e.g., shopping mall). However, such gift cards are still often impersonal. The gift cards are also typically pre-printed with certain events or notes, so if a particular event or note associated with the card is not available at a certain store, then the purchaser may not purchase the card from that store. Moreover, certain events are less popular, so card companies may not be able to print and maintain a stock of cards associated with all types of event options (e.g., Bar Mitzvahs, Arbor Day, Congratulations on joining the debate team, etc.).

Prior art gift cards also typically included many standard features that other credit cards have included in the past such as, for example, magnetic stripe on the back of the card, embossed numbers on the front of the card and a card identification number. Prior art cards may also have included a signature block on the back of the card. The signature block has always included a very narrow rectangle that was specifically limited to accepting one line of text, namely the signature of the card holder. Prior art systems may have limited the signature panel to the back of the card to avoid the credit card swipe machines (which roll over only the front of the card) from scraping the signature panel, and the more modern POS devices (which require a portion of the card to be slid through a track) from also scraping the signature panel. Moreover, because the signature panel is reserved for a signature, and credit card companies strongly encouraged card holders to immediately sign the signature block, the signature block was never available for inclusion of any other customizable text or graphics.

SUMMARY

A financial transaction device is disclosed. The device includes a first surface and a second surface. The first surface comprises a first writable field configured to enable writing on the first writable field. The second surface comprises at least one of a signature field, magnetic stripe, microprocessor, bar code, QR bar code, transponder, biometric data and radio frequency component. The device may be at least one of a charge card, gift card, smart card, and loyalty card. The first writable field may be any size, located in any place on the first surface and any shape. The first writable field enables printing of at least one of a custom note, picture, design, logo, pattern and indicia. The first writable field may be created by at least one of a heated stamping process and attaching a writable tape on the first surface. The indicia on the first surface may be visible through the first writable field, while the first writable field may be erasable or removable.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

FIG. 1 is an exemplary embodiment of the financial transaction device.

DETAILED DESCRIPTION

The new product and/or article of manufacture is a transaction card with a larger writable field. The larger writable field allows transaction card purchasers to include a custom note, picture, design, logo, pattern and/or any other indicia on the card. Such a writable field allows the purchaser to include any type of personal note, holiday wish, specific congratulatory note, special drawing, etc. The writable field creates an added element of thoughtfulness to make the gift exchange more special. An exemplary embodiment of a gift card with the writable field, along with the packaging is attached hereto.

The writable field also enables the purchaser to buy multiple gift cards, not knowing the intended recipient or the specific event to be associated with the gift card. After the purchaser becomes aware of an event for a friend (e.g., friend just got engaged), then the purchaser can quickly customize the card (e.g., "Rob and Susan make a great couple") and present it to the recipient. The purchaser may also be able to customize the card to any specific holiday or event that may not be associated with a gift card currently available at a store (e.g., Bar Mitzvahs, Arbor Day, Congratulations on joining the debate team, etc.). The recipient may also use the writable field to make a note about the account balance, a note about who they received the card from or any other note. Customized notes entered by the purchaser may also allow recipients to remember why they received the card. For example, the note may state "congratulations to Emma on getting straight As", so the mother will know that that specific gift card should be used by her daughter at the toy store to buy a special gift for her academic achievements.

FIG. 1 shows one embodiment of a transaction device. Transaction device 100 includes a first surface 105 and a second surface 120. First surface 105 includes an account number 110 and a writable field 115. Second surface 120 includes a signature field 125 and a magnetic strip 130.

In one embodiment, writable field 115 is larger than the signature field 125 on the back of the card to allow for a larger writing surface area. The larger writing surface area allows the user to more freely customize the card with larger notes or larger pictures. Larger notes or pictures are an important feature because such larger features may be more easily located and more easily viewed by the card holder, while the larger features greatly add to the customized look of the card. In one embodiment, the writable field may be about 0.75 inches in height by about 2.5 inches wide. Other embodiments may include "vertical" cards with writable field 115 rotated ninety degrees along with the scene on the card. Writable field 115 may also include any shape such as, for example, circular, crescent shaped, rectangle, square, uneven sides, random shapes and/or the like.

The larger writable field 115 may be located anywhere on the front (e.g., first surface 105) or back (e.g., second surface 120) of the card, but in an exemplary embodiment, writable field 115 is located on the front surface of the transaction card. The writable field 115 on the front surface of the card allows for a more personal and customized look to the front of the card. Most card holders view the front of the card to see the logos and to see the card sponsor/partner, so the front of the card is an important place for including any additional information that is more likely to be viewed by the card holder. In contrast, the back of the card is rarely, if ever, viewed by the card holder. The merchant is more likely to view the back of the card, but even the merchant may only check the back of the card for fraud prevention information.

The writable field 115 may be located anywhere on the front of the card, but in one embodiment, the writable field 115 is above the embossed account number 110. The writable field 115 may also be offset from center and next to the indicia showing the amount or denomination 116 of the card. Writable field 115 may be one contiguous field or may include multiple writable fields on the same card.

Writable field 115 may enable a pen, pencil, marker or other writing instrument to make a mark on the writable field 115. Writable field 115 may also enable a printing device (e.g., kiosk, computer printer, typewriter, photo printer, etc) to print customized text, pictures or other indicia in the writable field 115. In one embodiment, a user can send instructions to a printer to print in the writable field any design or text on a computer screen or from any website. A kiosk or home computer may also access a website or other data (via any network discussed herein) that provides various pre-set options for printing onto the writable field. The user or website may also obtain instructions for placement of the card in the printer such that writable field 115 (and/or packaging) is appropriately aligned to accept the printing within the writable field.

In an embodiment, the transaction device 100 is a card. The card may be comprised of plastic (e.g., PVC), clear material, titanium, metal (e.g., tin, aluminum), carbon, carbon fiber, graphite and/or other materials or composites. In one embodiment, the transaction card is comprised of plastic, and the writable field is created using a heated stamping process, or a writable tape on top of the plastic card. Writable field 115, or any portion thereof, may be any color or any material. The writable field, or any portion thereof, may also be opaque, fully transparent or partially transparent. The fully transparent or partially transparent embodiments may allow the logos or other indicia on the card surface to be seen through the writable field. If writable field 115 on the front of the card includes similar technology as the signature field 125 on the back of the card, then the card fabricators may be able to achieve economies of scale when creating the writable fields.

In an exemplary embodiment, the transaction card is a gift card. Importantly, most gift cards typically are housed within, or temporarily affixed on top of, a packaging. When the card is within a package, the package often has a "window" made of plastic or simply cut out of the packaging, so only the front of the card is viewable. When the purchaser provides the gift card to the user, the gift card is often still within, or on top of the packaging. As such, neither the purchaser, nor the user ever views the back of the card because the back of the card is covered. In that regard, including a writable field on the front of the card is very advantageous to allow the purchaser to customize the front of the card such that the customization may still be viewed while within, or on top of, the packaging.

Further with respect to associating the card with packaging, the front of the card (e.g., first surface 105) may include logos, designs or other indicia that match or complement the packaging surface. In that regard, the writable field on the front of the card may also enable a user to not only customize the card, but the user may also customize the entire card and package "scene". The packaging may also include writable areas that may or may not be contiguous with the card writable area.

As used herein, the terms "purchaser", "user", "card holder" or similar terms may be used interchangeably and may include any person, entity, software, hardware, machine and/or the like that may purchase the card, receive the card, use the card, write on the writable field, create a note on the writable field or the like.

The transaction card may comprise any type of card such as, for example, a gift card, loyalty card, debit card, charge card, credit card, calling card, a rewards card, prepaid card, telephone card, embossed card, smart card, magnetic stripe card, bar code card, transponder, radio frequency card and/or the like. An "account" or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account number may be, for example, any number or alpha-numeric characters that identify a particular merchant for purposes of card acceptance, account reconciliation, reporting, or the like.

The writable field transaction card may be distributed in association with a prepaid card distribution system, such as for example, a system and method for distributing an open transaction instrument. The method may include the steps of: accessibly offering for sale, in a retail environment, the open transaction instrument; selling a consumer selected open transaction instrument; and enabling the use of the open transaction instrument. The transaction instrument may be, for example, an open pre-paid card. Furthermore, accessibly offering the open pre-paid card for sale, in one exemplary embodiment, is performed by hanging the pre-paid card on a rack. The distribution of the open transaction instrument may also comprise the step of sending a message, in substantially real time, causing the pre-paid open transaction instrument to be funded but not activated until later through an interactive voice response system, for example. In accordance with further exemplary embodiments, an issuer system may be configured to leverage pre-existing inventory and financial settlement processing systems, such as a Travelers Cheque infrastructure. For more details related to this distribution system, see for example, U.S. Pat. No. 7,243,839 filed on Jan. 14, 2005 and entitled "Systems, Methods, And Devices For Selling Transaction Instruments," which is hereby incorporated by reference in its entirety.

The writable field transaction card may also be distributed in association with a browser-based system at a point of sale. The browser-based system may comprise a browser-based tool configured to facilitate distributing an open transaction instrument at the point of sale in association with purchase of the open transaction instrument by a consumer at the point of sale; the browser-based tool configured to receive transaction information and to facilitate the distribution of the open transaction instrument by sending the transaction information from the browser-based tool to a host system, wherein the host system authorizes distribution of the open transaction instrument, funds and activates a transaction account associated with the open transaction instrument, and sends an authorization message to the browser-based tool. The browser-based tool may be further configured to receive said authorization and provide an indication of said authorization for the open transaction instrument to be vended to a consumer, wherein a card number is associated with the open transaction instrument and the transaction account. For more details related to this distribution system, see for example, U.S. Pat. No. 7,191,939, filed on Jan. 25, 2005 and entitled "Systems, Methods, And Devices For Selling Transaction Instruments Via Web-Based Tool," which is hereby incorporated by reference in its entirety.

The writable field transaction card may also be associated with a display on the card. The display may be included in a stored value transaction card which may comprise some or all of: a magnetic stripe; a wireless chip integrated within the stored value transaction card for receiving wireless information from a database separate from the transaction card wherein the wireless information is based upon a purchase transaction, and wherein the wireless information comprises an account balance remaining associated with a stored value transaction account associated with the stored value transaction card; a display coupled to the wireless chip and disposed as a screen on a surface of the transaction card for displaying the account balance remaining received by the wireless chip; and a switch on the surface of the transaction card, the switch configured to activate the wireless chip to receive the account balance remaining and to cause the account balance remaining to show on the display on the surface of the transaction card, wherein said stored value transaction card is configured to be read by a card reader. For more information related to displays on cards, see for example, U.S. Pat. No. 7,440,771 filed on Feb. 28, 2003 and entitled "Transaction Card Providing Displayed Information," which is hereby incorporated by reference in its entirety.

In another embodiment, the transaction card may comprise some or all of a keypad disposed on the financial transaction card configured to receive input information; a first electronic display device disposed on the financial transaction card; and a second electronic display device disposed on the financial transaction card. The first electronic display device may be configured for temporarily displaying identification information related to a user associated with the financial transaction card. The identification information may be unencoded and unencrypted, wherein the first electronic display device may be configured to display the identification information responsive to input information received via the keypad. The second electronic display may be configured to display a spending limit associated with the financial transaction card. The second electronic display may be configured to change the spending limit displayed responsive to a transaction facilitated by the financial transaction card. For more information related to displays on cards, see for example, U.S. Ser. No. 11/235,033 filed on Sep. 26, 2005 and entitled "Financial Transaction Tools Having Display Devices," which is hereby incorporated by reference in its entirety.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the methods described herein are implemented using the various particular machines described below. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, and/or the like. Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

The system contemplates uses in association with web services, utility computing, pervasive and individualized computing, security and identity solutions, autonomic computing, commodity computing, mobility and wireless solutions, open source, biometrics, grid computing and/or mesh computing.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. Reference to an element in the singular is not intended to mean "one and only one" unless explicitly so stated, but rather "one or more." Moreover, where a phrase similar to 'at least one of A, B, and C' is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A financial transaction device comprising:
   a first surface and a second surface;
   the first surface comprising a first exposed writable field, wherein the first exposed writable field is exposed to physical contact from a writing instrument, and wherein the first exposed writable field allows a writing instrument to impart a notation on the first exposed writable field; and
   the second surface comprising at least one of a signature field, account number, expiration date, logo, magnetic stripe, microprocessor, bar code, QR bar code, transponder, biometric data and radio frequency component.

2. The device of claim 1, wherein the device is at least one of a charge card, gift card, smart card, and loyalty card.

3. The device of claim 1, wherein the first exposed writable field is located above an account number.

4. The device of claim 1, wherein the first exposed writable field is larger than the signature field.

5. The device of claim 1, wherein the second surface comprises a signature field, and the first exposed writable field and the signature field comprise the same material.

6. The device of claim 5, wherein the first exposed writable field is at least twice the surface area of the signature field.

7. The device of claim 1, wherein the first exposed writable field is non-electronic and non-magnetic.

8. The device of claim 1, wherein the first surface and the first exposed writable field have a first dimension that is at least twice a second dimension.

9. The device of claim 1, wherein the first exposed writable field enables printing of at least one of a custom note, picture, design, logo, pattern and indicia.

10. The device of claim 1, wherein the first exposed writable field comprises a writable tape.

11. The device of claim 1, wherein the first exposed writable field is opaque.

12. The device of claim 1, wherein indicia on the first surface is visible through the first exposed writable field.

13. The device of claim 1, wherein the first exposed writable field comprises a heat-stamped foil.

14. The device of claim 1, wherein the first exposed writable field is removable.

15. The device of claim 1, wherein the first surface comprises at least one of a signature field, account number, expiration date, logo, magnetic stripe, microprocessor, bar code, QR bar code, transponder, biometric data and radio frequency component.

16. The device of claim 1, further comprising a packaging coupled to the second surface.

17. The device of claim 16, wherein the packaging further comprises a second exposed writable field.

18. The device of claim 17, wherein the first exposed writable field is adjacent to the second exposed writable field.

19. An article of manufacture comprising:
   a financial transaction device with a first surface and a second surface, wherein the first surface comprises a first exposed writable field, wherein the first exposed writable field is exposed to physical contact from a writing instrument, and wherein the first exposed writable field allows a writing instrument to impart a notation on the first exposed writable field;
   wherein the second surface comprises at least one of a signature field, account number, expiration date, logo, magnetic stripe, microprocessor, bar code, QR bar code, transponder, biometric data and radio frequency component; and
   a packaging coupled to the second surface, wherein the packaging comprises a second exposed writable field substantially contiguous with the first exposed writable field.

20. The article of manufacture of claim 19, wherein the second surface comprises a magnetic stripe.

* * * * *